US006774837B2

(12) United States Patent
Barrick et al.

(10) Patent No.: US 6,774,837 B2
(45) Date of Patent: Aug. 10, 2004

(54) OCEAN SURFACE CURRENT MAPPING WITH BISTATIC HF RADAR

(75) Inventors: Donald E. Barrick, Redwood City, CA (US); Peter M. Lilleboe, San Jose, CA (US); Belinda J. Lipa, Portola Valley, CA (US); James Isaacson, Austin, TX (US)

(73) Assignee: Codar Ocean Sensors, Ltd., Los Altos, CA (US)

( * ) Notice: Subject to any disclaimer, the term of this patent is extended or adjusted under 35 U.S.C. 154(b) by 0 days.

(21) Appl. No.: 10/694,154

(22) Filed: Oct. 27, 2003

(65) Prior Publication Data

US 2004/0090363 A1 May 13, 2004

Related U.S. Application Data

(63) Continuation of application No. 10/027,161, filed on Dec. 19, 2001, now abandoned.
(60) Provisional application No. 60/327,217, filed on Oct. 4, 2001, provisional application No. 60/315,567, filed on Aug. 28, 2001, and provisional application No. 60/308,235, filed on Jul. 26, 2001.

(51) Int. Cl.[7] .......................... G01S 13/95; G01S 13/58
(52) U.S. Cl. .......................... 342/26; 342/59; 342/104; 342/113; 342/147; 342/195; 342/357.01; 342/357.06
(58) Field of Search .......................... 342/22, 25–28, 342/59, 104–117, 175, 192–197, 357.01–357.17, 190, 191, 147–158

(56) References Cited

U.S. PATENT DOCUMENTS

| 3,882,506 A | 5/1975 | Mori et al .................. 343/728 |
| 4,101,891 A * | 7/1978 | Fletcher et al. ............... 342/25 |
| 4,172,225 A | 10/1979 | Woldseth et al. |
| 4,433,336 A | 2/1984 | Carr ............................ 343/728 |
| 4,996,533 A | 2/1991 | May et al. .................. 342/108 |
| 5,023,618 A | 6/1991 | Reits ........................... 342/128 |
| 5,252,980 A | 10/1993 | Gray et al. ..................... 342/59 |
| 5,361,072 A | 11/1994 | Barrick et al. .............. 342/133 |
| 5,381,222 A | 1/1995 | Palmer |
| 5,434,570 A | 7/1995 | Wurman ...................... 342/26 |
| 5,469,168 A | 11/1995 | Anderson .................... 342/26 |

(List continued on next page.)

FOREIGN PATENT DOCUMENTS

| EP | 0 860 708 A2 | 8/1998 |
| GB | 2 350 003 A | 11/2000 |

OTHER PUBLICATIONS

Barrick and Evans, "Impementation of coastal current–mapping HF radar system,"*Progress Report No. 1, NOAA Tech Reprot ERL 373–WPL 47*, 1976.

(List continued on next page.)

Primary Examiner—Bernarr E. Gregory
(74) Attorney, Agent, or Firm—Fulbright & Jaworski, LLP

(57) ABSTRACT

A bistatic radar system (100), method and computer program (178) are provided for mapping of oceanic surface conditions. Generally, the system (100) includes at least one transmitter (102) and at least one receiver (106) located separate from one another, and each having a local oscillator locked to a Global Positioning System (GPS) signal received by a GPS synchronization circuit (134) to provide the necessary coherency between the transmitted and received signals. Preferably, the present invention enables an existing backscatter radar systems to be quickly and inexpensively upgraded to a bistatic radar system (100) through the addition of a transmitter (102) and/or receiver (106) separate from the backscatter radar system, the GPS circuit (134), and use of the computer program (178) and method of the present invention.

19 Claims, 6 Drawing Sheets

U.S. PATENT DOCUMENTS

| | | | |
|---|---|---|---|
| 5,469,169 A | 11/1995 | Frush | 342/26 |
| 5,471,211 A | 11/1995 | Randall et al. | 342/26 |
| 5,534,868 A | 7/1996 | Gjessing et al. | 342/26 |
| 5,546,087 A | 8/1996 | Martin Neira | 342/120 |
| 5,990,834 A | 11/1999 | Barrick et al. | 342/418 |
| 6,130,644 A | 10/2000 | Massonnet | 342/453 |
| 6,137,433 A | 10/2000 | Zavorotny et al. | 342/26 |
| 6,232,922 B1 | 5/2001 | McIntosh | 342/453 |
| 6,264,143 B1 | 7/2001 | Massonnet | 244/158 R |
| 6,462,699 B2 | 10/2002 | Wurman et al. | 342/59 |
| 6,590,523 B2 * | 7/2003 | Barrick | 342/191 |
| 2003/0025629 A1 | 2/2003 | Barrick et al. | 342/59 |
| 2003/0071751 A1 | 4/2003 | Barrick et al. | 342/104 |

OTHER PUBLICATIONS

Barrick and Lipa, "Evolution of bearing determination in HF current mapping radars," *Oceanography*, 10(2):72–75, 1997.

Barrick, "Comment on Single station ocean current vector measurement: Application of the spaced antenna (SA) technique," *Geophys. Res. Letters*, 17:1637–1639, 1990.

Barrick, "FM/CW radar signals and digital processing," *NOAA Tech. Report ERL 283–WPL 26*, 1973.

Barrick, et al., "Ocean surface currents mapped by radar, "*Science*, 198:138–144, 1977.

Bjorkstadt and Roughgarden, "Larval transport and coastal upwelling: and application of HF radar in ecological research," *Oceanography*, 10(2):64–67, 1988.

Ereemev, et al., "Reconstruction of oceanic flow characteristics from quasi–Lagrangian data. 1. Approach and mathematical methods," *J. Geophys. Res.*, 97(C6):9733–9742, 1992.

Frisch and Leise, "A note on using continuity to extend HF radar surface current measurements," *J. Geophys. Res.*, 86:11089–11090, 1981.

Lipa and Barrick, "Extraction of sea state from HF radar sea echo: Mathematical theory and modeling," *Radio Sci.*, 21:81–100, 1986.

Lipa and Barrick, "Least–squares methods for the extraction of surface currents from CODAR crossed–loop data: Application at ARSLOE," *IEEE J. Oceanic Engr.*, OE–8:226–253, 1983.

Lipphardt et al., "Blending HF radar and model velocities in Monterey Bay through normal mode analysis," *J. Geophys. Res.*, 105(C2):3425–3450, 2000.

Zel'dovich et al., "On the representation of three–dimensional vector fields with scalar potentials (in Russian)," *Dokl. Akad. Nauk. SSSR*, 284(1):103–106, 1985.

* cited by examiner

OCEAN SURFACE CURRENT MAPPING WITH BISTATIC HF RADAR

REFERENCE TO RELATED APPLICATION

This is a continuation of, and claims priority to, co-pending U.S. patent application Ser. No. 10/027,161, filed Dec. 19, 2001 abandoned.

This application claims priority to U.S. Provisional Applications Serial Nos. 60/308,235 filed Jul. 26, 2001, Ser. No. 60/315,567 filed Aug. 28, 2001, and Ser. No. 60/327,217 filed Oct. 4, 2001, all of which are incorporated herein by reference.

FIELD OF THE INVENTION

The present invention relates generally to radar systems and more particularly to a radar systems and method for mapping surface currents in large bodies of water.

BACKGROUND OF THE INVENTION

Low-frequency backscatter radar systerns, operating in the MP, HF, VHF, and low UHF bands are widely used for mapping surface water velocity such as currents on the oceans and flow along rivers.

The most commonly used are backscatter radar systems that use Doppler principles to measure current velocity. Two effects contribute to the backscatter Doppler shift: (i) the motions of waves that Bragg scatter, i.e., whose lengths are exactly half the radar wavelength; and (ii) the component of the underlying current that transports the surface waves along the bearing of the radar. For a backscatter radar, the wave Doppler occurs at a single frequency and is precisely known, and can be readily subtracted from a measured Doppler shift to get the desired radial current speed. Thus, the waves serve as tracers of the underlying currents. That is, information about these waves is not being sought; it is only necessary that they be present to serve as radar targets.

Range or distance to the scattering cell is obtained from the time delay between transmit and received radar signals as described, for example, in commonly assigned U.S. Pat. No. 5,361,072, which is incorporated herein by reference. Following range processing, the echo time series for each range cell is Fourier transformed to obtain Doppler spectra and cross spectra among several receive antennas or elements. The Bragg peaks used for current extraction are identified and isolated. At each Doppler spectral bin (corresponding to a definable current radial velocity), the angular bearing of the echo is obtained from the directional properties of the receive antennas using a bearing determining algorithm. One suitable bearing determining algorithm, for example, is the MUltiple SIgnal Classification (MUSIC) direction-finding algorithm as described in commonly assigned U.S. Pat. No. 5,990,834, which is incorporated herein by reference. Thus, the backscatter radar makes its measurements in a polar coordinate system in which radial current velocity is mapped as a function of distance and bearing angle.

A single backscatter radar system can measure only the radial component of a two-dimensional horizontal current velocity vector. Therefore, normally two backscatter radar systems are used in pairs, spaced tens of kilometers apart along the coast and operating independently. Based on the known geometry and location of a mutually observed scattering cell two resulting radial velocity components are combined to produce a total velocity vector map across the overlapping coverage zone. Thus, one shortcoming of conventional systems for mapping surface water velocities is the need for multiple, costly backscatter radar systems.

Another shortcoming with conventional systems is that backscatter radar systems cannot resolve a total vector on or near a line joining the two backscatter radar systems, because both are measuring the same component of velocity. This is particularly a problem for regions falling along the coast or across rivers and mouths of bays, which are often of great interest.

An alternative approach for mapping surface water velocities uses a bistatic radar system in which one or more receivers operate with two or more transmitters spaced apart therefrom. Resultant echo sets based on the signals simultaneously radiated from each isolated transmitter-receiver pair, can then be used to construct non-parallel components of velocity at the scattering cell. A major drawback to this approach is the expense of synchronizing a geographically separated transmitter and receiver. Previous bistatic systems have employed highly stable Cesium or Rubidium timing standards, or oven-controlled phase-lock loops to maintain coherent signal bases at the separated points. In addition, to being expensive such methods are ill suited to harsh environments to which ocean sensing radar systems are routinely exposed.

A more fundamental problem with the use of bistatic radar systems is that in contrast to backscatter radar systems, contours of constant time delay for bistatic radar systems define ellipses confocal about the transmitter and receiver pair. As a result, the Doppler shift due to the wave motion is no longer a constant as it is with backscatter radar systems, but varies with position around the cell or contours of constant time delay.

Accordingly, there is a need for a radar system and method of operating the same that improves coverage area and accuracy in regions where geometry of the system would normally preclude monitoring with conventional backscatter radar systems. It is also desirable that the radar system and method be robust and inexpensive. It is also desirable that the radar system and method enable existing ocean sensing radar systems to be easily and inexpensively upgraded.

The radar system and method of the present invention provides these and other advantages over the prior art.

SUMMARY OF THE INVENTION

The present invention provides a bistatic radar system and method for mapping surface currents in bodies of water that offers both expanded coverage area and stable estimates of current velocity in zones or regions where conventional backscatter radar systems have not been effective.

It is an object of the present invention to provide oceanic current information using a bistatic radar system that improves coverage area and accuracy in regions where instabilities normally preclude monitoring with conventional backscatter radar systems.

It is a further object of the present invention to reduce complexity, cost, and use of radio spectral resources by synchronizing the modulating signals of transmitters and receivers of a bistatic radar system with Global Positioning System (GPS) timing signals.

It is a yet further object of the present invention to provide a method and computer program product for transforming or converting time-delay or range, bearing, and velocity relationships used in conventional backscatter radar systems into the required current velocity maps used with elliptic/hyperbolic geomnetries of bistatic radar systems.

According to one aspect of the present invention, a bistatic radar system is provided having a number of transmitters and receivers for transmitting and receiving radar signals. Preferably, at least one transmitter is positioned in a location separate from at least one receiver, and each of the transmitting and receivers include a local oscillator locked to Global Positioning System (GPS) signals to provide the necessary coherency between the transmitters and receivers. More preferably, the transmitters and receivers are configured to detect and measure oceanic conditions, and the bistatic radar system further includes signal processing means adapted to derive information on the oceanic conditions. Oceanic conditions detected and measured by the number of transmitters and receivers can include, for example, surface current velocity vectors.

Generally, the signal processing means is adapted to determine a current velocity within a scattering cell using a Doppler shift ($f_D$) of the radar echoes, and the following equation:

$$V_h = \frac{f_D \pm \sqrt{\frac{g}{\pi \lambda} \cos \frac{\theta}{2}}}{\frac{2}{\lambda} \cos \frac{\theta}{2}}$$

where $\lambda$ is the wavelength of the radar signals; g is the acceleration of gravity (9.806 m/s$^2$); $\theta$ is a bistatic angle between lines connecting the transmitter and the scattering cell and the receiver and the scattering cell; and $V_h$ is the velocity component measurable from the bistatic radar system. The current velocity, $V_h$, is determined along a hyperbola perpendicular to an ellipse passing through the scattering cell and confocal about the transmitter and receiver, the ellipse having a constant time delay (D) equal to the measured radar echo time delay. In one embodiment, the Doppler shift ($f_D$) is measured directly using the bistatic radar system. In another embodiment, the signal processing means is adapted to calculate a Doppler shift ($f_D$) using the following equation:

$$f_D = \pm \sqrt{\frac{g}{\pi \lambda}} + 2 \frac{V_r}{\lambda}$$

where $\lambda$ is the wavelength of the radar signals; g is the acceleration of gravity (9.806 m/s$^2$); and $V_h$ is a pseudo-radial current velocity derived in a pseudo backscatter stage using a computer program developed for a backscatter radar system and oceanic conditions detected and measured by the plurality of transmitters and receivers.

Preferably, the bistatic radar system is adapted to provide surface current velocity vectors that are independent of motions of waves having velocities over a Doppler spectral region substantially the same as the surface current velocity vectors. More preferably, the bistatic radar system is adapted to provide total current vectors in regions along lines joining multiple receivers.

According to another aspect of the present invention, a method is provided for mapping surface current vectors using a radar system including a number of transmitters and receivers, including a bistatic radar subsystem having at least one transmitter positioned in a location separated from at least one receiver. Generally, the method involves steps of: (i) scattering radar signals from the transmitter off ocean waves in a scattering cell to produce echoes in the receiver; (ii) determining a bearing angle ($\phi$) to the scattering cell using using a bearing determining algorithm; (iii) sampling versus time after transmission to measure radar echo time delay from the transmitter to the receiver; (iv) determining the location of the scattering cell; and (v) determinig a current velocity at the scattering cell.

Generally, the step of determining a current velocity at the scattering cell is based on the bistatic angle between lines connecting the transmitter and the scattering cell and the receiver, the Doppler shift ($f_D$) of the radar echoes and the position of the scattering cell. As provided above, the Doppler shift can either be measured directly from the Doppler shift of a bistatic transmitter—receiver pair, or calculated from a hypothetical radial backscatter velocity component measured relative to one of the receivers.

The procedure for determining a position of the scattering cell includes the steps of: (i) determining a major axis (A) of an ellipse passing through the scattering cell and confocal about the transmitter and receiver, the ellipse having a constant time delay (D) equal to the measured radar echo time delay; (ii) determining a minor axis (B) of the ellipse; (iii) determining sine and cosine of an angle ($\Psi$) from the scattering cell to an origin of a local coordinate system; and (iv) determining the position of the scattering cell within the local coordinate system from the sine and cosine of the angle and the major and minor axis of the ellipse.

In yet another aspect, the present invention is directed to a computer program product for use in conjunction with a computer system to accomplish steps of the above method. The computer program product includes a computer readable storage medium and a computer program mechanism embedded therein. The computer program mechanism, includes a program module that directs the computer system, to function in a specified manner, to map surface current vectors using a radar system including a number of transmitters and receivers, including a bistatic radar subsystem having at least one transmitter positioned in a location separated from at least one receiver. Generally, the computer program includes: (i) a radar control subroutine or program module; (ii) a bearing angle ($\phi$) determining subroutine or program module; (iii) an echo time delay subroutine or program module; (iv) a position determining subroutine or program module; and (v) a current velocity subroutine or program module.

Advantages of the computer program and method of the present invention include any one or all of the following:

(i) reduced complexity, cost, and use of radio spectral resources through synchronization of transmitters and receivers using GPS tuimng signals;

(ii) ability to quickly and relatively inexpensively improve the coverage area and accuracy of conventional current-mapping backscatter radar systems by deploying additional transmitters andlor receivers;

(iii) compact transmit subsystem designs, requiring no computer nor air-conditioning resources, and suitable for remote deployment where solar energy is a preferred source;

(iv) ability to radiate from vertical whip transmit antennas that can be mounted on buoys, offshore structures, or building rooftops without incurring the resulting complications of antenna pattern distortions that can affect the ability to measure bearing angles accurately; and (v) elimination of antenna pattern distortions caused by uncontrolled rotation of an antenna mounted on a buoy or offshore structure due to wave motion.

BRIEF DESCRIPTION OF THE DRAWINGS

The invention will be more clearly understood from the following description when read in conjunction with the accompanying drawings of which.

DETAILED DESCRIPTION

The present invention is bistatic radar system and a method for operating the same to map surface currents in bodies of water, such as oceans, seas, bays, harbors, rivers and lakes.

Figure 1:
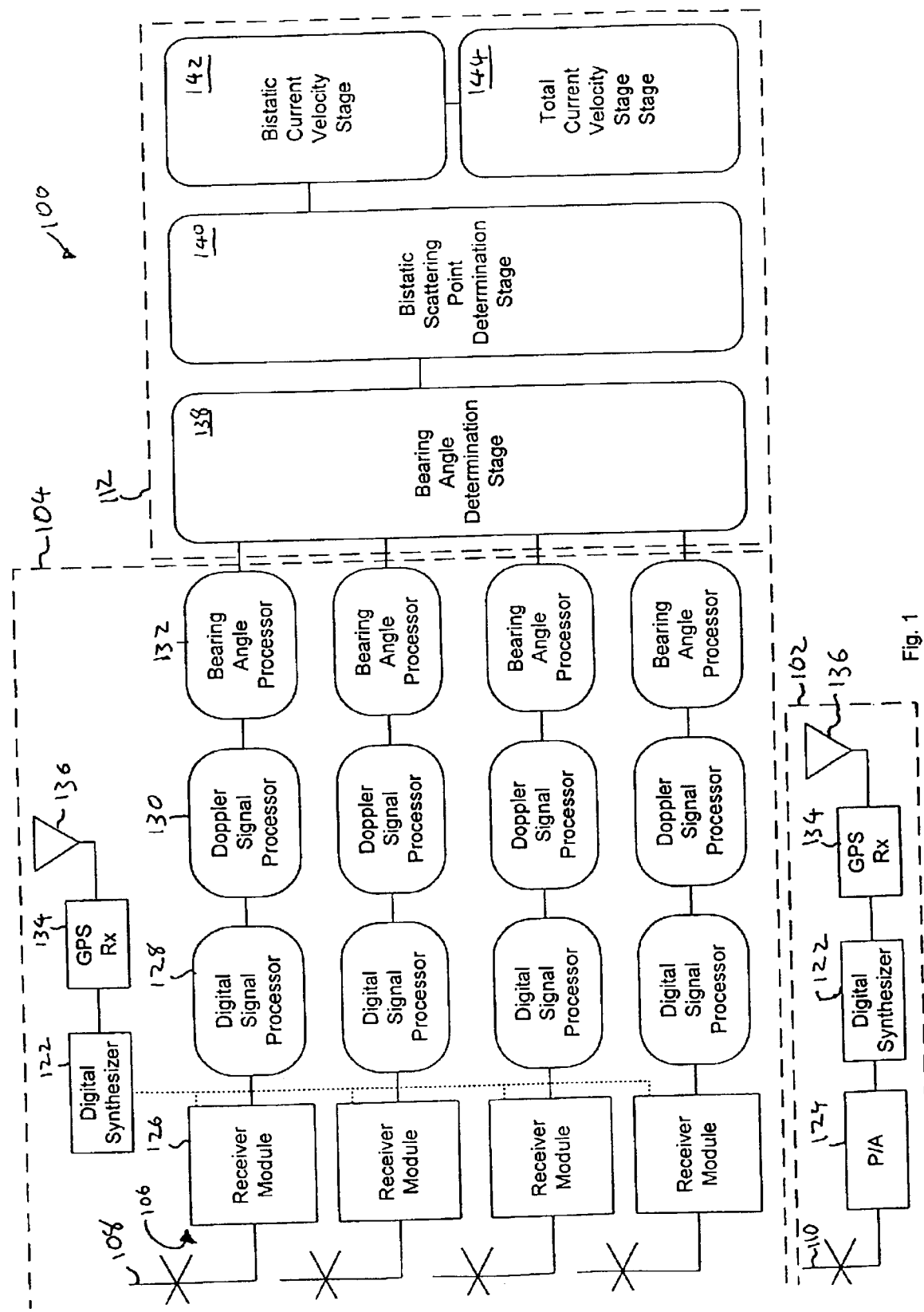
FIG. 1 is a block diagram showing the hardware components and signal processing stages of current information from bistatic radar systems, according to an embodiment of the present invention.

A bistatic radar system according to an embodiment of the present invention will now be described with reference to FIG. 1. FIG. 1 is an exemplary block diagram of a bistatic radar system 100 including a number of transmitters and receivers for transmitting and receiving radar signals. At least one transmitter is positioned in a location separated from at least one receiver, and the necessary coherency between the transmitters and receivers provided using a Global Positioning System (GPS) signal according to an embodiment of the present invention. For purposes of clarity, many details of radar systems that are widely known and are not relevant to the present invention have been omitted.

FIG. 1 shows the hardware components and signal processing stages of the bistatic radar system 100. It is noted that blocks shown as sharp-cornered rectangles represent hardware components. Rounded-corner blocks represent the key signal processing steps performed on the received radar data, and can be executed by a software program running in real time on a digital comnputer.

Figure 2:
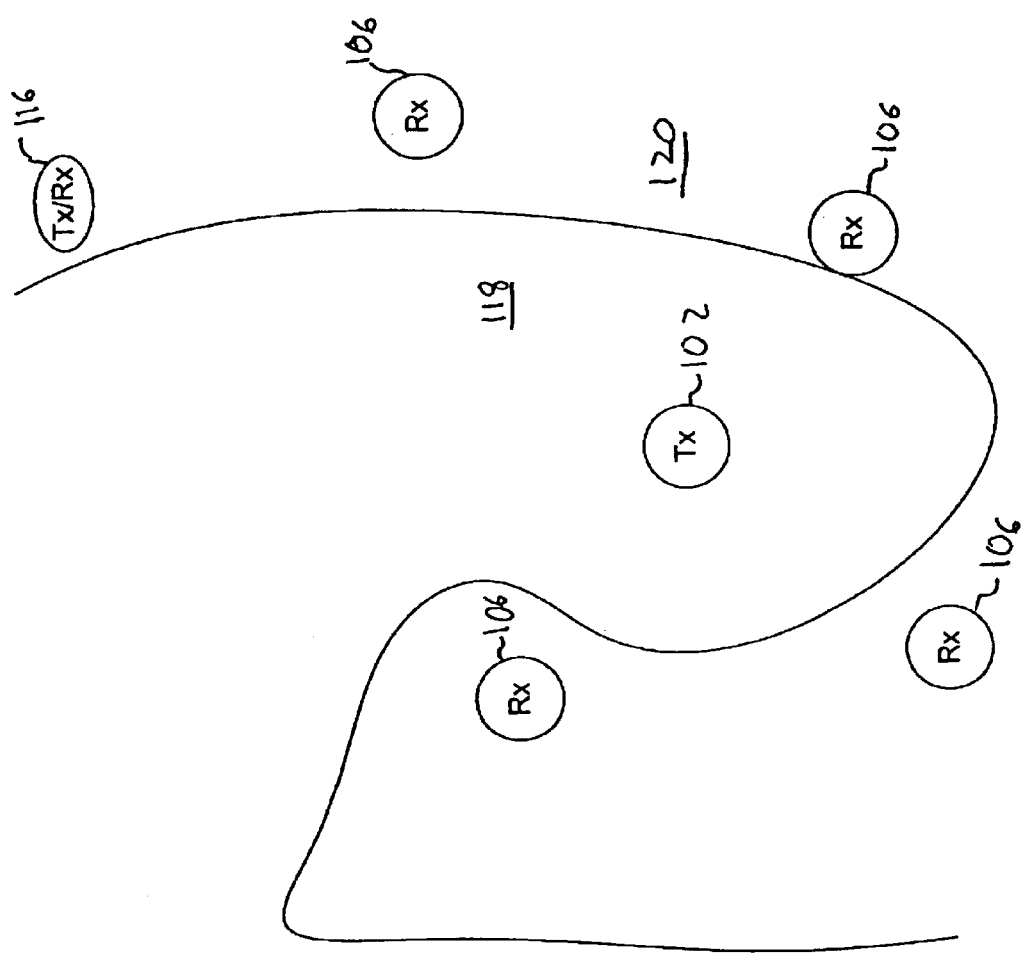
FIG. 2 is a plan view showing the location of transmitter and receivers of a bistatic radar system according to an embodiment of the present invention in and around a body of water.

Referring to FIG. 1, the bistatic radar system 100, generally includes a transmitter 102 that cooperates with a receive-section 104 having several individual receivers 106 to enable investigation of oceanic or water surface conditions. Receive-antennas 108 of the receivers 106 receive echoes of radar signals transmitted from a transmit-antenna 110 of the transmitter 102 and scattered from waves in a scattering point or cell (not shown in this figure). A signal processor 112 processes information derived from the radar echoes to determine and display information on oceanic conditions. Such information includes surface current velocity vectors. To operate in the bistatic mode the transmit-antenna 110 is geographically separated from at least one receive-antennas 108, as shown in FIG. 2. That is, the transmit-antenna 110 and at least one receive-antenna 108 are located so that an angle between the line joining the transmit-antenna and a scattering cell 114, and the line joining the receive-antenna and the scattering cell is non-zero. Preferably, to maximize the area covered by the bistatic radar system 100, all of the receivers 106 or receive-antennas 108 are separated from the transmit-antenna 110 and from one another. No physical connections or wires link or provide a communication path between the transmitter 102 and receivers 106. Distances between the two depend on the frequency and mapping coverage needed from the bistatic radar system 100 and can range from about 2 to about 200 kilometers (km). In a backscatter radar system 116, for contrast and illustration, the transmitter and transmit-antenna are co-located at the same position as the receiver.

It will be appreciated that, the electronic components of the transmitter 102 and the receivers 106 need not be near their respective antennas 108, 110. Nor do receivers 106 need to be near to the signal processor 112. For example, it is often advantageous to place the signal processor 112, from which a user or operator accesses information on ocean conditions, in a shelter sorne distance from the receivers 106. The signal processor 112 can be linked to the receivers 106 via a land-line or a wireless communication path. Similarly, the electronic components of the transmitter 102 and the receivers 106 can be in an enclosure or building to which the antennas 108, 110 are affixed, and coupled to the antennas via a short cable or wire.

Advantageously, the transmitter 102 and the transmit-antenna 110 are a self-contained unit powered, for example, using photovoltaic cells, a fuel cell, or battery. In one preferred embodiment, the transmitter 102 is placed on a water-borne platform such a boat, barge, platform or buoy, and surrounded partly or entirely by a ring of receive-antennas 108. For example, the transmitter 102 can be on a buoy in a harbor or bayl 18, and the receive-antennas 108 can be on other buoys or shore installations such as buildings on land 120 around the bay, as shown in FIG. 2.

Generally, the transmitter 102 includes a digital synthesizer 122 having a local oscillator (not shown) for generating a carrier frequency or wave and a signal for modulating the carrier wave to produce the radar signal transmitted by the transmitter. For a bistatic configuration the radar signal can take the format of, for example, a continuous 20 MHz carrier wave modulated as described in U.S. Pat. No. 5,361,072. The modulated radar signal is then passed from the digital synthesizer 122 through a transmit-amplifier or power-amplifier 124 and radiated from the transmit-antenna 110. The transmit-antenna 110 is usually configured to provide a broad beam, usually between 120° and 360° in bearing angle, illuminating a large area of ocean or water concerning which information on oceanic conditions is needed.

The receivers 106 include a receiver module 126 for receiving and decoding radar echoes, and several signal processing stages or signal processors for extracting information the received echoes. The receiver module 126 mixes the received echoes with a signal generated by a local oscillator (not shown) to decode the echoes. Generally, the signal processors have both hardware and software elements. Preferably, each receiver module 126 includes an analog-to-digital (A/D) convertor (not shown) to provide an output that is a digital time series that can be digitally processed by the signal processors. A digital signal processor 128 determines the position of a time-delay cell and outputs a time series of radar echo and noise for each range cell. A Doppler signal processor 130, in a process known as coherent integration or processing, orders potential target echoes into a two-dimensional space of range and Doppler frequency. A final processing stage, a bearing angle processor 132, identifies signals of interest and separates them from background noise and clutter before determining an echo bearing angle. Each of these three signal processors 128, 130, 132, are described in greater detail in U.S. Pat. Nos. 5,361,072 and 5,990,834, which are incorporated herein by reference.

Because precise timing is required between the radiated signal and the received signals to allow coherent radar processing, the transmitter 102 and each receiver 106 further include a GPS satellite receiver 134 to synchronize the modulating signal in the transmitter with the locally generated signal in the receiver module 126. These GPS satellite receivers 134 are small devices that come equipped with their own satellite antenna 136 and are commercially available from several vendors, including, for example, the Thuderbolt GPS Disciplined Clock sold by Trimble Navigation Limited of Sunnyvale, Calif. One method of utilizing a GPS timing signal for synchronizing the modulating signals of the transmitter 102 and receivers 106 is described, for example, in commonly assigned, co-pending U.S. Provisional Applications Serial No. 60/315,567 filed Aug. 28, 2001, and incorporated herein by reference. Local phase locked oscillators (PLO) in the transmitter 102 and receivers 106 lock to a GPS signal from the GPS satellite receivers 134 to provide a common reference. The PLO serves as an electronic flywheel that over a period of time builds up to an accuracy of $10^{12}$ to $10^{13}$ parts per million.

The signal processor 112 includes a general purpose digital computer, such as a personal computer or PC, programmed according to the present invention to process information derived from the radar echoes to determine and display information on oceanic conditions. Generally, the signal processor 112 encompasses several elements or stages in which information is processed, including a bearing angle determination stage 138, a bistatic scattering point determination stage 140, a bistatic current velocity stage 142, and a total current velocity vector stage 144. Each of these stages aid the operations performed therein will now be descrbed with reference to FIGS. 1 and 3.

In the first or bearing angle determination stage 138 the bearing or bearings, range and Doppler for each scattering cell 114 or cells are determined from digital target echo signals received from each receiver 106. In a preferred embodiment, this determination made using a suitable bearing determining algorithm, such as the MUltiple Signal Classification (MUSIC) direction-faiding algoritlun described in U.S. Pat. No. 5,990,834. This stage, the bearing angle determination stage 138, can also be called a pseudo-backscatter stage, since, as in a backscatter radar system in which a transmitter and receiver co-located, the output from this stage 138 can be represented as a polar mapping of radial surface current velocity versus range and bearing. Each Doppler shift (or spectral bin) is related to the velocity component of the scattering cell 114 moving toward or away from the backscatter radar system. This by definition is the radial velocity ($V_r$).

Figure 3:
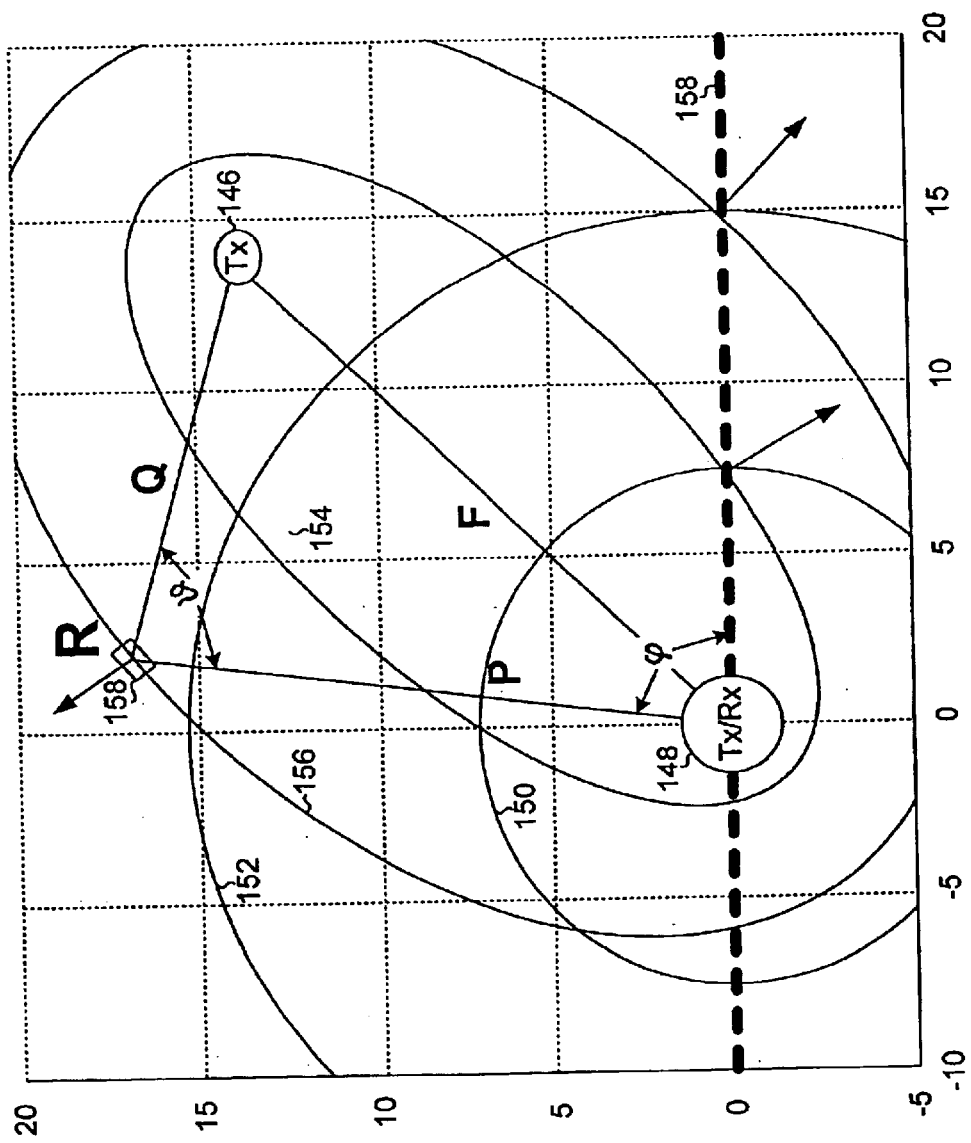
FIG. 3 is a graph illustrating relationships between the measurable current vectors and the geometry of both backscatter and bistatic radar systems according to an embodiment of the present invention.

In one embodiment, the output of the pseudo backscatter stage 138, is transformed into a bistatic total current velocity vector map corresponding to the radial surface current velocity map of a backscatter radar system. The mathematics and physics of this transformation, from a radial surface current velocity map to a total current velocity vector map, will now be described with reference to FIG. 3. Referring to FIG. 3, the transmitter 102 of a bistatic radar system 100 according to the present invention is located at a circle 146 at a position x, y=14.1, 14.1 of a coordinate system. The location of the receiver 106 is shown by circle 148 at the origin, x, y=0, 0, of the coordinate system. For purposes of illustration and comparison this is also the location of a monostatic or backscatter transmitter that forms a backscatter radar system when operating with this receiver 106. For the backscatter radar system, contours of constant time delay between transmission and reception of the echo signal to targets form circles 150, 152, concentric to the location of the backscatter radar system, shown here as circle 148. In contrast, for the bistatic radar system 100, contours of constant time delay define a family of ellipses 154, 156, confocal about the transmitter 102 at circle 146 and receiver 106 at circle 148. Consequently, the interfocal distance of the family of ellipses, denoted here as F, the distance between transmitter 102 and receiver 106, and in FIG. 3 is equal to twenty units.

There are three output observables for backscatter radar systems, whose analogue bistatic counterparts are sought to define the desired bistatic total current velocity vector map: (i) range to the scattering cell 114; (ii) bearing angle, $\phi$, to the scattering cell; and (iii) the radial velocity, $V_r$ of the water (the current) at the scattering cell. The corresponding outputs or counterparts for the bistatic radar systems include: (i) position of the scattering cell 114 (two coordinates are required to define horizontal position); and (ii) the current velocity component available from the bistatic radar at the scattering cell.

A local coordinate system (not shown) is employed for the bistatic configuration, whose origin is the midpoint of the line along F between the receiver 106 and transmitter 102. The x' axis of this local coordinate system is directed toward the transmitter 102 at circle 146, and the y' axis is counterclockwise perpendicular to it.

The position of the scattering cell 114 at R, x', y', in the local coordinate system is determined in the bistatic scattering point determination stage 140 using the following mathematical steps.

The measured radar echo time delay, D, of an ellipse passing through the scattering cell 114 is related to the distance from receiver 106 to scattering cell, P, the distance from scattering cell to the transmitter 102, Q, and the distance, F, separating the transmitter and receiver 106 by the following equation:

$$D=P+Q-F \quad \text{(Eq. 1)}$$

The major axis, A, of the ellipse passing through the scattering cell 114 with the given time delay D is given by the following equation:

$$A=D+F \quad \text{(Eq. 2)}$$

The minor axis, B, of the ellipse passing through the scattering cell 114 with the given time delay D, lying along the y' axis is given by the following equation:

$$B=\sqrt{D^2+2DF} \quad \text{(Eq. 3)}$$

Recalling that the bearing angle, $\phi$, to the scattering cell 114 was measured and is known from the bearing angle determination stage 138 using the direction-finding algorithm, the following equation provides a denominator, Den, needed for subsequent equations:

$$Den=(B \sec\phi)^2 +(F \tan\phi)^2 \quad \text{(Eq. 4)}$$

The cosine of an angle from the origin of the local coordinate system, x'=0, y'=0, to the scattering cell 114 at R, is given the following equation:

$$\cos\psi = \frac{-F(F+D)\tan^2\varphi + B^2\sec\varphi}{Den} \quad \text{(Eq. 5)}$$

The sine of an angle from the origin of the local coordinate system, x'=0, y'=0, to the scattering cell 114 at R, is given the following equation:

$$\sin\psi = \frac{(F+(F+D)\sec\varphi)B\tan\varphi}{Den} \quad \text{(Eq. 6)}$$

Desired position of scattering cell 114 in the local coordinate system are given by the following equations:

$$x' = \frac{A}{2}\cos\psi; \quad y' = \frac{B}{2}\sin\psi; \quad \text{(Eq. 7)}$$

Current velocity ($V_r$) is along a hyperbola perpendicular to an ellipse passing through the scattering cell is determined in the bistatic current velocity stage 142 using the following mathematical steps.

A backscatter Doppler shift $f_D$ of the echo signal seen by a receiver-transmitter pair at circle 148 in FIG. 3 is related to a wavelength of the radar and the radial component of the current velocity. It is noted that the Doppler shifted, $f_D$, was previously measured in the Doppler signal processor 130 as described above. The Doppler shift $f_D$ of the echo signal from the backscatter configuration is expressed by the following equation:

$$f_D = \pm\sqrt{\frac{g}{\pi\lambda}} + 2\frac{V_r}{\lambda} \quad \text{(Eq. 8)}$$

where λ is the radar wavelength, which is known; g is the acceleration of gravity (9.806 m/s²) and $V_r$, is the radial component of the current velocity, directed toward or away from the radar. The ± sign denotes the two spectral Bragg peaks seen by HF radars, due to waveshalf the radar wavelengthrmoving toward (+) and away from (−) the radar. Both are used in extracting current information, providing redundant estimates, which improves the accuracy.

A bistatic Doppler shift $f_D$ of the echo signal seen by a receiver 106 at circle 148 and transmitter 102 at circle 146 in a bistatic configuration is expressed by the following equation:

$$f_D = \pm\sqrt{\frac{g}{\pi\lambda}\cos\frac{\partial}{2}} + 2\frac{V_h}{\lambda}\cos\frac{\partial}{2} \quad \text{(Eq. 9)}$$

where λ is the wavelength of the radar signals; g is the acceleration of gravity (9.806 m/s²); θ is a bistatic angle between lines connecting the transmitter 102 and the scattering cell 114, and the receiver 106 and the scattering cell; anid $V_h$, is the current velocity measurable by the bistatic radar system 100.

As with the backscatter Doppler shift, Eq. 8, the first tenm in Eq. 9 represents the Doppler shift due to the wave motion. That is the scatter from Bragg waves advancing toward or moving away from a baseline separating the transmitter 102 and receiver 106, which have increasing or decreasing constant time delays, D. This term also suggests the complication of bistatic configurations. The Doppler shift due to the wave motion is no longer a constant as for backscatter configurations, but varies with position around the range cell or ellipse of constant time delay. Thus, it is necessary to separate the Doppler shift due to the wave motion from the Doppler shift due to current. It is the difficulty of this separation that has rendered use of bistatic radar systems to monitor oceanic conditions non-obvious in the prior art. The velocity component measurable from the bistatic system is called $V_h$ in contrast with the backscatter geometry, because it lies along a hyperbola that is perpendicular to the ellipse at the scattering point. This vector, $V_h$, is shown at point R in FIG. 3. As a check of the validity of Eq. 9, note that as the transmitter 102 and receiver 106 move together so that the configuration becomes that of a monostatic or backscatter radar, that is as the bistatic angle goes to zero, Eq. 9 reduces to Eq.8.

Current velocity ($V_h$) along the hyperbola will now be derived from the measured Doppler shift using the following equation:

$$V_h = \frac{f_D \pm \sqrt{\frac{g}{\pi\lambda}\cos\frac{\partial}{2}}}{\frac{2}{\lambda}\cos\frac{\partial}{2}} \quad \text{(Eq. 10)}$$

where λ is the wavelength of the radar signals; g is the acceleration of gravity (9.806 m/s²); θ is a bistatic angle; and $V_h$, is the current velocity along the hyperbola passing through the scattering cell 114.

Next, the direction of $V_h$ with respect to the local x', y' coordinate system is determined as follows. Recalling that the bistatic Doppler shift was previously measured in the Doppler signal processor 130, the steps below show how to determine the required bistatic angle.

The following equations define vectors P, Q and their unit vectors, p', q' that point away from the receiver and transmitter, respectively toward the scattering point:

$$P = \{x' + F/2, y'\}, \hat{p}' = \frac{P}{|P|} \quad Q = \{x' - F/2, y'\}, \hat{q}' = \frac{Q}{|Q|} \quad \text{(Eq. 11)}$$

Normal and unit normal vectors outward from the ellipse at the scattering point are defined by the following equations:

$$N = \left\{\frac{B}{2}\cos\varphi, \frac{A}{2}\sin\varphi\right\}; \quad \hat{n} = \frac{N}{|N|} \quad \text{(Eq. 12)}$$

From these sets of unit normal vectors, the cos of (θ/2), which is needed to determine the velocity component in Eq. 9, is found using the following equation:

$$\cos\left(\frac{\partial}{2}\right) = \hat{p}' \cdot \hat{n} = \hat{q}' \cdot \hat{n} \quad \text{(Eq. 13)}$$

Substituting the cos of (θ/2), into Eq. 9 provides the magnitude of bistatic vector $V_h$, and its components within the local coordinate system along x', y'—defined as u', v'—are now given as:

$$(u', v') = V_h \cdot \hat{n} \quad \text{(Eq. 14)}$$

These are the final current velocity components measurable by the bistatic radar system 100, at the point x', y' in the local coordinate system defined by the backscatter or transmitter-receiver geometry. Based on the many Doppler spectral bins, a map of hyperbolic velocity components, $V_h$, can now be constructed from the measured sea echo data.

It will be appreciated that these velocity components u', v' at points x', y' defining this transmitter-receiver oriented map can be transformed and rotated to any other coordinate system that is convenient, by well known mathematical techniques. For example, if the coastline is oriented along the heavy dashed line 158 of FIG. 3, then the coastline-oriented system shown might be more appropriate. Or in other cases, an earth-based latitude-longitude (East-North) system is selected.

The hyperbolic velocity, $V_h$, based current mapping derived from the bistatic radar system 100 as outlined above is not a complete representation of horizontal current flow. Neither is the radial current map derivable from a backscatter radar system having a single backscatter radar. Both systems measure only one component of the two-dimensional current vector at each point on the map. Therefore a total current velocity vector map is determined in a final stage, the total current velocity vector stage 144.

Prior art backscatter radar systems required at least two complete backscatter radars viewing the same point on the surface from two different directions to produce a radial current vector map. Moreover, as noted above, this precluded determining current vectors at and near the "baseline" joining the two backscatter radar systems. For example, if a second backscatter radar were located along the heavy dashed line 158 representing the coast in FIG. 3, say at position (20,0), the backscatter radar system could not produce current vector maps covering the important area near the coast where the angle between the two vectors approaches zero.

In contrast, the bistatic radar system 100 of the present invention having a receiver-transmitter pair at circle 148 augmented by a transmitter 102 at circle 146, can produce an accurate total current vector estimates over the full area covered by the bistatic radar system, including the area along the coast. Circles define the constant time delay contours (or range cells) at which radial maps from the receiver-transmitter pair at circle 148 operating in a backscatter form produces radial vectors, $V_r$. Operating simultaneously, measurements from the bistatic configuration of transmitter 102 at the circle 146 and a receiver 106 at the circle 148 produce hyperbolic vectors, $V_h$, at the same coastal points. As shown, these vectors are no longer parallel in fact, they lie at a considerable angle to each other. Thus, a bistatic radar system 100 according to the present invention, having two transmitters 102, a single receiver 106, and a signal processor 112, is capable of providing a total current velocity vector map over the full area covered by the system, including the area along the coast.

Figure 4:
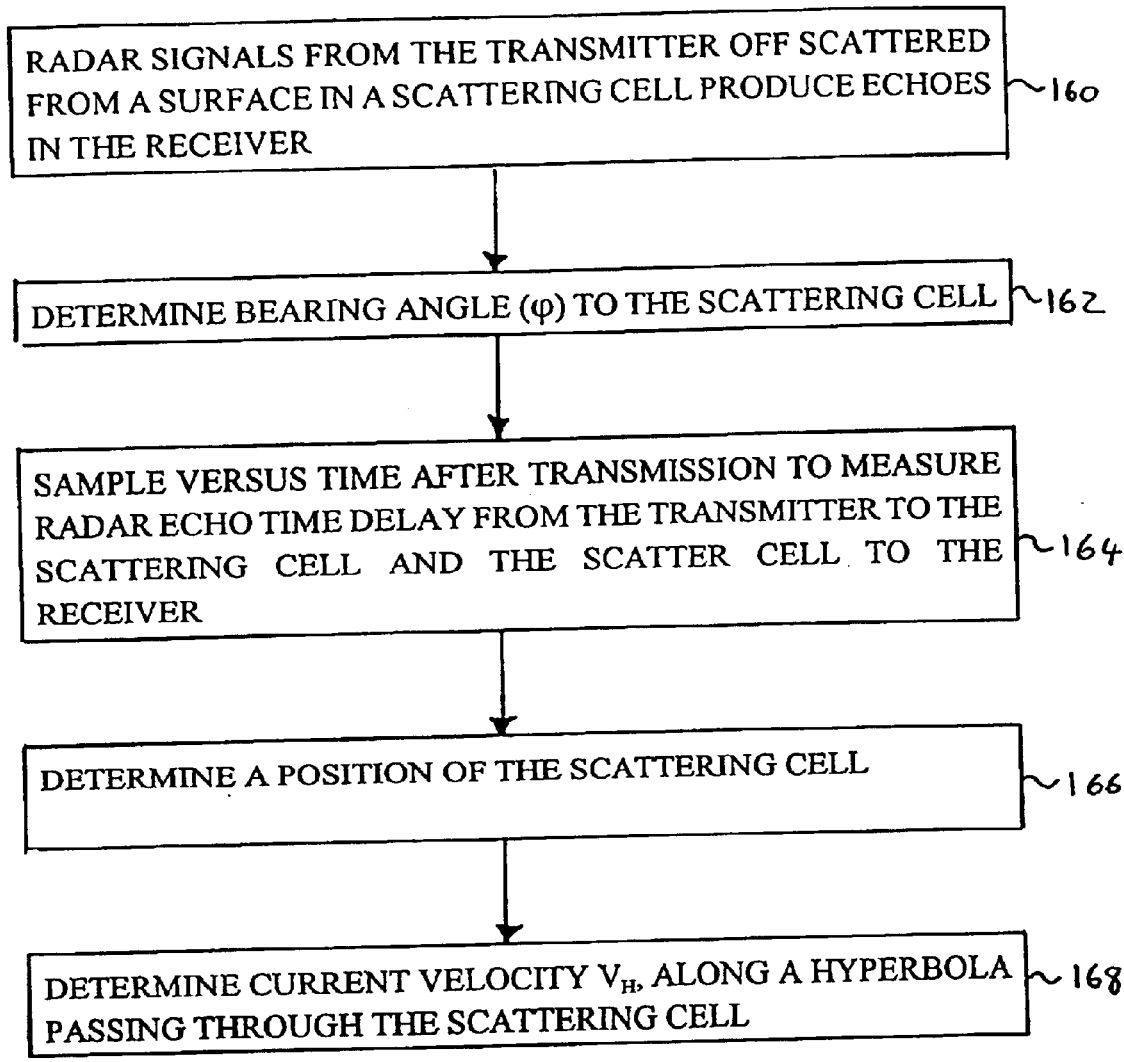
FIG. 4 is a flowchart showing a method of operating a bistatic radar to map surface current vectors according to an embodiment of the present invention.

A method or process for mapping surface current vectors according to an embodiment of the present invention will now be described with reference to FIG. 4. FIG. 4 is a flowchart showing steps of a method for operating a bistatic radar system according to an embodiment of the present invention. In the method, radar signals are radiated from the transmitter and are reflected off a scattering cell to produce echoes in the receiver (step 160). A bearing angle ($\phi$) to the scattering cell is determined using a bearing determined algorithm, such as the MUSIC direction-finding algorithm or any other suitable bearing angle determining algorithm (step 162). Thie radar echoes are sampled versus time after transmission to measure radar echo time delay from the transmitter to the receiver (step 164). The position of the scattering cell is determined (step 166), and the velocity of the surface current at the scattering cell determined or calculated using Eq. 10 given above (step 168). Generally, the step of determining current velocity at the scattering cell, step 168, involves determining a Doppler shift ($f_D$) for the radar echoes. In one enbodiment, this Doppler shift is measured directly using the separated transmitter and receiver of the bistatic radar system. Alternatively, the Doppler shift may also be calculated from the bearing angle ($\phi$) and a radial current velocity relative to the receiver, $V_r$, using Eq. 8 given above.

Figure 5:
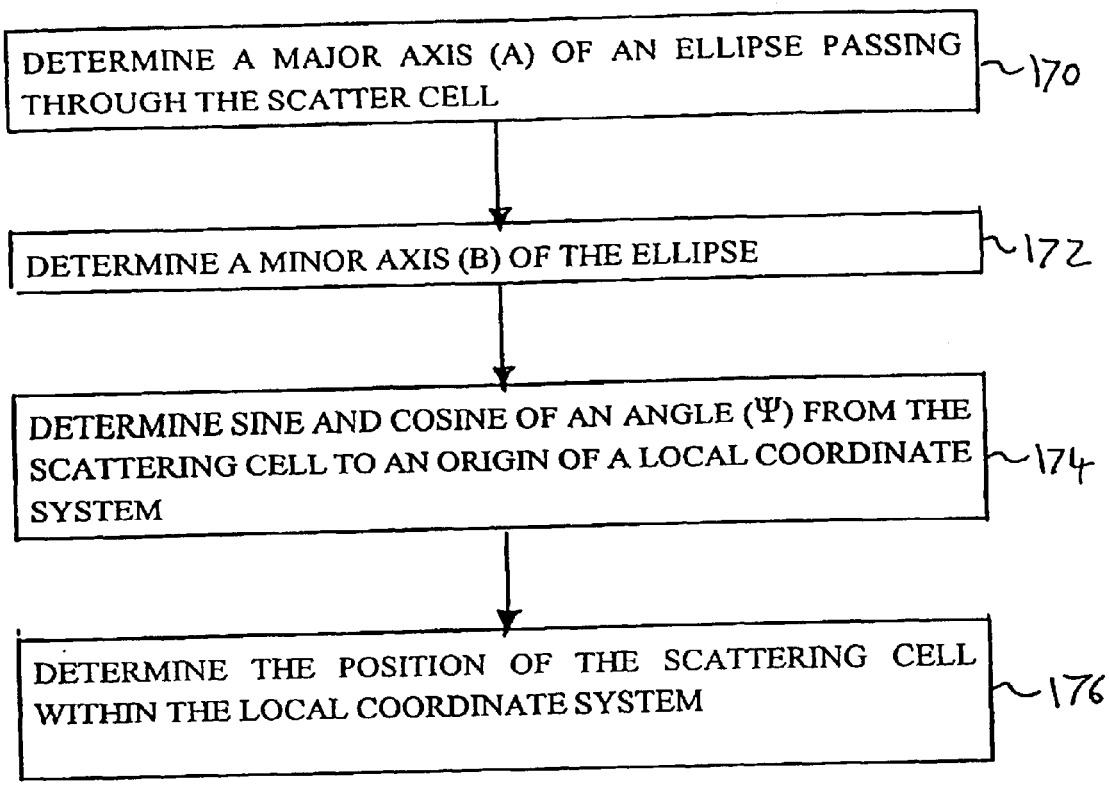
FIG. 5 is a flowchart showing a method for determining the position of the scattering cell according to an embodiment of the present invention.

A method or process for determining the position of the scattering cell according to an embodiment of the present invention will now be described with reference to FIG. 5. Referring to FIG. 5, the method can be accomplished by: (i) determining a major axis (A) of an ellipse passing through the scattering cell and confocal about the transmitter and receiver, the ellipse having a constant time delay (D) equal to the measured radar echo time delay (step 170); (ii) determining a nor axis (B) of the ellipse (step 172); (iii) determining sine and cosine of an angle ($\Psi$) from the scattering cell to an origin of a local coordinate system (step 174); and (iv) determining the position of the scattering cell within the local coordinate system from the sine and cosine of the angle and the major and minor axises of the ellipse (step 176). Generally, the step of determining the major axis, step 170, is accomplished using Eq. 2 given above. The step of determining the minor axis, step 172, is accomplished using Eq. 3, and the step of determining sine and cosine of $\Psi$, step 174, is accomplished using Eqs. 4 and 5. Finally, the step of determining the position of the scattering cell of the within the local coordinate system, step 176, is accomplished using Eqs. 7 above.

Figure 6:
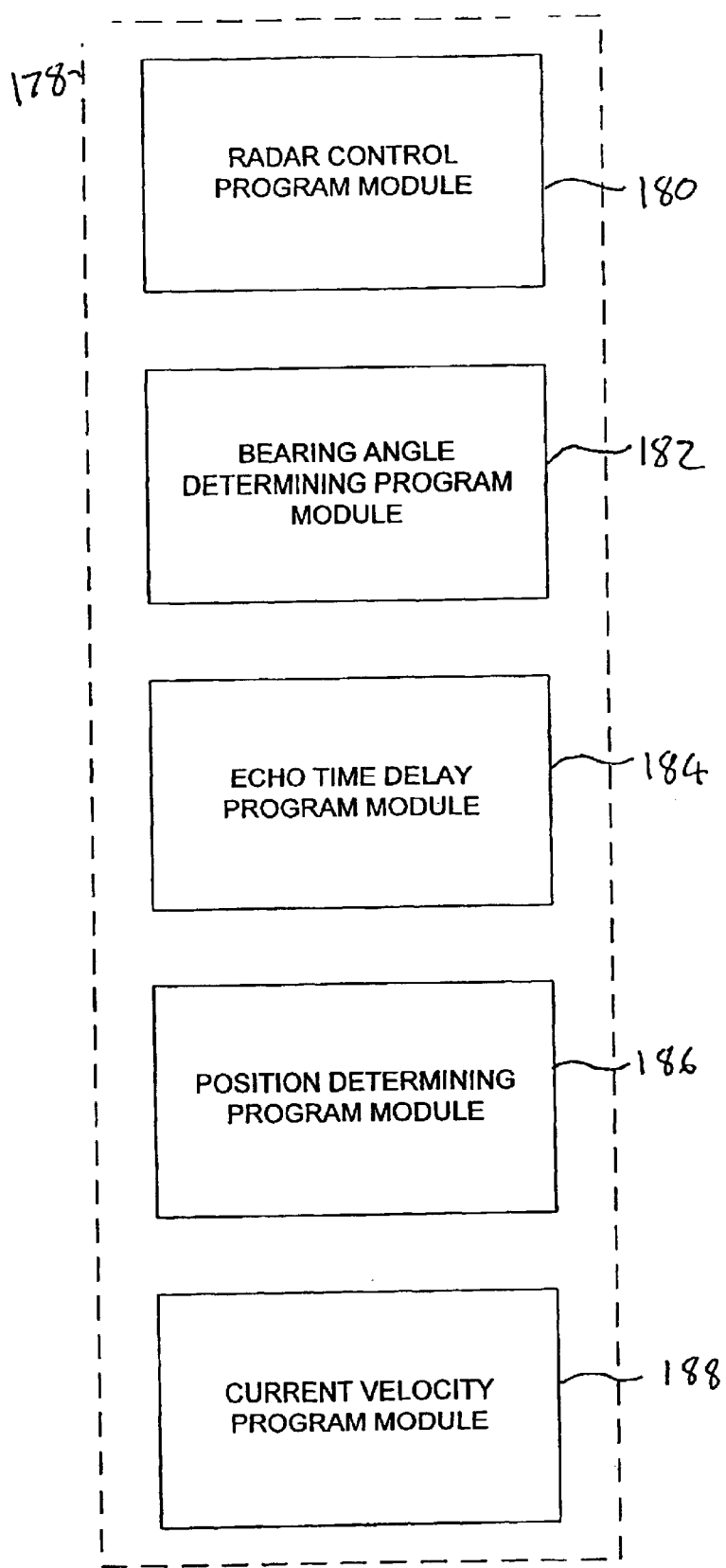
FIG. 6 is a block diagram of an embodiment of a computer program showing modules for mapping surface current vectors according to an embodiment of the present invention.

A computer program for performing each step of the above processes will now be described with reference to FIG. 6. FIG. 6 is an illustrative block diagram of a computer program 178 according to an embodiment of the present invention. The computer program 178 generally includes: (i) a radar control subroutine or program module 180; (ii) a bearing angle ($\phi$) determining subroutine or program module 182; (iii) an echo time delay subroutine or program module 184; (iv) a position determining subroutine or program module 186; and (v) a current velocity subroutine or program module 188. The radar scattering program module 180 includes program code adapted to operate or control the bistatic radar system 100 to scatter radar signals from the transmitter 102 off the scattering cell 114 to produce echoes in a receiver 106. The bearing angle ($\phi$) determining module 182 includes program code adapted to determine a bearing angle ($\phi$) to the scattering cell 114 using a bearing determining algorithm. The echo time delay program module 184 includes program code adapted to measure a time delay of the echoes. The position determining module 186 includes program code adapted to determine the position of the scattering cell 114 within the local coordinate system. The current velocity program module 188 includes program code adapted to determining the current velocity at the scattering cell 114.

In one emnbodiment, the current velocity program module 188 includes program code using a Doppler shift measured directly using a geographically separated transmitter 102 and receiver 106 of the bistatic radar system 100. Alternatively, the current velocity program module 188 further includes a program to calculate the Doppler shift from the bearing angle ($\phi$) and a radial current velocity, $V_r$, measured relative to a receiver 106 in a backscatter configuration.

The foregoing description of the preferred embodiments of the invention have been presented for the purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. For example, more than two transmitters can operate with a single receiver. Likewise, there are situations where multiple receivers operating with a single transmitter may have advantages, as in military operations where greater radio silence is preferred. All of these possibilities constitute alternative embodiments of the present invention. Thus, it is intended that the scope of the invention be defined by the claims appended hereto and not limited to the precise embodiments described herein.

What is claimed:

1. A system comprising:
   (a) a bistatic radar including a transmitter and receiver that:
      (i) are placed in fixed, separated locations;
      (ii) transmit and receive radar signals for determining surface current velocity vectors; and
      (iii) are synchronized using Global Positioning System (GPS) signals; and
   (b) a signal processor that determines the surface current velocity vectors using a Doppler shift of radar echoes of the bistatic radar.

2. A bistatic radar system according to claim 1, wherein the signal processing means is adapted to determine a current velocity within a scattering cell using a Doppler shift ($f_D$) measured using the bistatic radar system, and the following equation:

$$V_h = \frac{f_D \pm \sqrt{\frac{g}{\pi\lambda}\cos\frac{\theta}{2}}}{\frac{2}{\lambda}\cos\frac{\theta}{2}}$$

wherein $\lambda$ is the wavelength of the radar signals; g is the acceleration of gravity; and $\theta$ is a bistatic angle between lines connecting the transmitter and the scattering cell and the receiver and the scattering cell; and $V_h$, is the current velocity along a hyperbola passing through the scattering cell.

3. A bistatic radar system acording to claim 1, wherein the signal processing means is adapted to calculate a Doppler shift ($f_D$) using a computer program developed for a backscatter radar system and the following equation:

$$f_D = \pm\sqrt{\frac{g}{\pi\lambda}} + 2\frac{V_r}{\lambda}$$

wherein $\lambda$ is the wavelength of the radar signals; the acceleration of gravity (9.806 m/s$^2$); and $V_r$, is a pseudo-radial current velocity derived in a pseudo backscatter stage using the computer program developed for a backscatter radar system and oceanic conditions detected and measured by the plurality of transmitters and receivers.

4. A bistatic radar system according to claim 3, wherein the signal processing means is adapted to determine a current velocity ($V_h$) along with a hyperbola passing through a scattering cell using the calculated Doppler shift ($f_D$) and the following equation:

$$V_h = \frac{f_D \pm \sqrt{\frac{g}{\pi\lambda}\cos\frac{\theta}{2}}}{\frac{2}{\lambda}\cos\frac{\theta}{2}}$$

where $\lambda$ is the wavelength of the radar signals; g is the acceleration of gravity (9.806 m/s$^2$); and $\theta$ is a bistatic angle between lines connecting the transmitter and the scattering cell and the receiver and the scattering cell.

5. A bistatic radar system according to claim 1, wherein the surface current velocity vectors derved from the oceanic conditions detected and measured are independent of motions of waves having velocities over a Doppler spectral region substantially the same as the surface current velocity vectors.

6. A bistatic radar system according to claim 1, wherein the bistatic radar system is adapted to provide total current vectors in regions along a line joining the receiver positioned in a location separated from the transmitter.

7. A method of mapping surface current vectors using a bistatic radar system comprising a transmitter and receiver placed in fixed, separated locations, the method comprising:
   scattering radar signals from the transmitter off waves within a scattering cell to produce echoes in the receiver;
   determining a bearing angle ($\phi$) to the scattering cell;
   sampling versus time after tranmission to measure radar echo time delay from the transmitter to the receiver;
   determining a position of the scattering cell; and
   determining a current velocity at the scattering cell.

8. A method according to claim 7, wherein the step of determining a current velocity at the scattering cell comprises the steps of:
   measuring a Doppler shift ($f_D$) using the at least one transmitter positioned in a location separated from the at least one receiver; and
   determining current velocity at the scattering cell using the following equation:

$$V_h = \frac{f_D \pm \sqrt{\frac{g}{\pi\lambda}\cos\frac{\theta}{2}}}{\frac{2}{\lambda}\cos\frac{\theta}{2}}$$

where $\lambda$ is the wavelength of the radar signals; g is the acceleration of gravity (9.806 m/s$^2$); $\theta$ is a bistatic angle between lines connecting the transmitter and the scattering cell and the receiver and the scattering cell; and $V_h$, is the current velocity along a hyperbola passing through the scattering cell.

9. A method according to claim 7, wherein the step of determining a current velocity at the scattering cell comprises the step of calculating a Doppler shift ($f_D$) using a computer program developed for a backscatter radar system and the following equation:

$$f_D = \pm\sqrt{\frac{g}{\pi\lambda}} + 2\frac{V_r}{\lambda}$$

where $\lambda$ is the wavelength of the radar signals; g is the acceleration of gravity (9.806 m/s$^2$); $V_r$ is a pseudo-radial current velocity derived in a pseudo backscatter step using the computer program developed for a backscatter radar system and information on oceanic conditions detected by the bistatic system.

10. A method according to claim 9, wherein the step of determining a current velocity at the scattering cell comprises the step of determining a current velocity ($V_h$) along a hyperbola passing through the scattering cell using the calculated Doppler shift ($f_D$) and the following equation:

$$V_h = \frac{f_D \pm \sqrt{\frac{g}{\pi\lambda}\cos\frac{\theta}{2}}}{\frac{2}{\lambda}\cos\frac{\theta}{2}}$$

where $\lambda$ is the wavelength of the radar signals; g is the acceleration of gravity (9.806 m/s$^2$); and $\theta$ is a bistatic angle between lines connecting the transmitter and the scattering cell and the receiver and the scattering cell.

11. A method according to claim 7, wherein the step of determining a position of the scattering cell comprises the step of:

determining a major axis (A) of an ellipse passing through the scattering cell and confocal about the transmitter and receiver, the ellipse having a constant time delay (D) equal to the measured radar echo time delay, determining a minor axis (B) of the ellipse;

determining sine and cosine of an angle ($\Psi$) from the scattering cell to an origin of a local coordinate system; and determining the position of the scattering cell of the within the local coordinate system from the sine and cosine of the angle and the major and minor axises of the ellipse.

12. A method according to claim 11, wherein the step of determining the major axis comprises using the following equation:

$$A = D + F$$

wherein F is an interfocal distance separating the transmitter and receiver.

13. A method according to claim 12, wherein the step of determining the minor axis comprises using the following equation:

$$B = \sqrt{D^2 + 2DF}$$

14. A method according to claim 13, wherein the step of determining sine and cosine of ($\Psi$) comprises using the following equations:

$$Den = (B\sec\phi)^2 + (F\tan\phi)^2$$

$$\cos\psi = \frac{-F(F+D)\tan^2\varphi = B^2\sec\varphi}{Den}$$

15. A method according to claim 7, wherein the step of determining the bearing angle ($\phi$) to the scattering cell comprises the step of determining the bearing angle ($\phi$) to the scattering cell using a MUlitple Signal Classification (MUSIC) direction-finding algorithm.

16. A computer program product for use in conjunction with a computer system, the computer program product comprising a computer readable storage medium and a computer program mechanism embedded therein, the computer program mechanism, comprising:

a program module that directs the computer system, to function in a specified manner, to map surface current vectors using a radar system comprising a plurality of transmitters and receivers, including at least one transmitter positioned in a fixed location separated from at least one receiver positioned in a second fixed location, the program module including program code for:

scattering radar signals from the transmitter off waves within a scattering cell to produce echoes in the receiver;

determining a bearing angle ($\phi$) to the scattering cell using a bearing determining algorithm;

sampling versus time after transmission to measure radar echo time delay from the transmitter to the receiver;

determining a position of the scattering cell; and determining a current velocity at the scattering cell.

17. A computer program product according to claim 16, wherein the program code for determining a current velocity at the scattering cell comprises program code for:

determining a Doppler shift ($f_D$) of the echoes; and calculating current velocity using the following equation:

$$V_h = \frac{f_D \pm \sqrt{\frac{g}{\pi\lambda}\cos\frac{\theta}{2}}}{\frac{2}{\lambda}\cos\frac{\theta}{2}}$$

where $\lambda$ is the wavelength of the radar signals; g is the acceleration of gravity (9.806 m/s$^2$); $\theta$ is a bistatic angle between lines connecting the transmitter and the scattering cell and the receiver and the scattering cell; and $V_h$, is the current velocity along a hyperbola passing the through the scattering cell.

18. A computer program product according to claim 17, wherein the program code for determining the Doppler shift ($f_D$) of the echoes comprises program code for measuring the Doppler shift using the at least one transmitter positioned in a location separated from the receiver.

19. A computer program product according to claim 17, wherein the program code for determining the Doppler shift ($f_D$) of the echo comprises program code for calculating the Doppler shift ($f_D$) using the following equation:

$$f_D = \pm\sqrt{\frac{g}{\pi\lambda}} + 2\frac{V_r}{\lambda}$$

wherein $\lambda$ is the wavelength of the radar signals; g is the acceleration of gravity (9.806 m/s$^2$); and $V_r$, is a pseudo-radial current velocity derived in a pseudo backscatter stage using the computer program developed for a backscatter radar system and oceanic conditions detected and measured by the plurality of transmitters and receivers.

* * * * *

UNITED STATES PATENT AND TRADEMARK OFFICE
CERTIFICATE OF CORRECTION

PATENT NO. : 6,774,837 B2 Page 1 of 1
APPLICATION NO. : 10/694154
DATED : August 10, 2004
INVENTOR(S) : Barrick et al.

It is certified that error appears in the above-identified patent and that said Letters Patent is hereby corrected as shown below:

In claim 2, column 13, line 47, delete "$V_h$," and insert --$V_h$ --.

In claim 3, column 13, line 59, delete "$V_r$," and insert --$V_r$ --.

In claim 5, column 14, line 15, delete "derved" and insert --derived--.

In claim 8, column 14, line 54, delete "$V_h$," and insert --$V_h$ --.

In claim 11, column 15, line 34, delete "scattering cell of the within" and insert --scattering cell within--.

In claim 13, column 15, line 48, delete "$B \equiv \sqrt{D^2} + 2DF$" and insert -- $B \equiv \sqrt{D^2 + 2DF}$ --.

In claim 17, column 16, line 39, delete "passing the through" and insert --passing through--.

In claim 17, column 16, line 39, delete "$V_h$," and insert --$V_h$ --.

In claim 18, column 16, line 57, delete "$V_r$," and insert --$V_r$ --.

Signed and Sealed this

Second Day of October, 2007

JON W. DUDAS
*Director of the United States Patent and Trademark Office*